US009215186B2

(12) United States Patent
Himayat et al.

(10) Patent No.: US 9,215,186 B2
(45) Date of Patent: *Dec. 15, 2015

(54) MULTI-RADIO COMMUNICATION BETWEEN WIRELESS DEVICES

(71) Applicant: Intel Corporation, Santa Clara, CA (US)

(72) Inventors: Nageen Himayat, Fremont, CA (US); Shilpa Talwar, Los Altos, CA (US); Kerstin Johnsson, Palo Alto, CA (US); Jaroslaw J. Sydir, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/321,688

(22) Filed: Jul. 1, 2014

(65) Prior Publication Data

US 2014/0313979 A1   Oct. 23, 2014

Related U.S. Application Data

(63) Continuation of application No. 12/909,544, filed on Oct. 21, 2010, now Pat. No. 8,767,536.

(60) Provisional application No. 61/259,086, filed on Nov. 6, 2009.

(51) Int. Cl.
*H04L 12/26* (2006.01)
*H04L 12/891* (2013.01)
*H04W 88/06* (2009.01)
*H04W 28/06* (2009.01)
*H04W 76/02* (2009.01)

(52) U.S. Cl.
CPC ............... *H04L 47/41* (2013.01); *H04W 88/06* (2013.01); *H04W 28/065* (2013.01); *H04W 76/025* (2013.01)

(58) Field of Classification Search
None
See application file for complete search history.

(56) References Cited

U.S. PATENT DOCUMENTS

| 2005/0135311 | A1* | 6/2005 | Maillard | 370/331 |
| 2009/0196309 | A1* | 8/2009 | Fujinaga et al. | 370/474 |
| 2010/0014423 | A1* | 1/2010 | Furuskar et al. | 370/235 |
| 2011/0074552 | A1* | 3/2011 | Norair et al. | 340/10.1 |

* cited by examiner

*Primary Examiner* — Chi H Pham
*Assistant Examiner* — Fahmida Chowdhury
(74) *Attorney, Agent, or Firm* — Kacvinsky Daisak Bluni PLLC

(57) ABSTRACT

In various embodiments, two wireless communication devices may communicate with each other using multiple protocols, by dividing the data to be communicated into multiple portions, and using each protocol to communicate different portions. The different protocols may be used simultaneously or concurrently. This multi-protocol technique may be used in several different ways to provide different types of advantages in wireless communications.

23 Claims, 6 Drawing Sheets

MULTI-RADIO COMMUNICATION BETWEEN WIRELESS DEVICES

CROSS REFERENCE TO RELATED APPLICATIONS

This application is a continuation of, claims the benefit of and priority to U.S. patent application Ser. No. 12/909,544, filed Oct. 21, 2010, which is derived from, and claims priority to U.S. provisional application Ser. No. 61/259,086, filed Nov. 6, 2009, both of which are incorporated herein in their entirety by reference.

BACKGROUND

An increasing number of wireless devices such as smart phones, laptops, netbooks, etc. are expected to support multiple types of wireless protocols in their communications. Examples are wide-area protocols such as WiMAX or LTE, local-area protocols such as WiFI, and personal-area protocols such as Bluetooth. Much effort has gone into making it possible for a first device to communicate with a second device using the best available protocol out of multiple possible protocols. And some devices are able to communicate with two different devices, using a different protocol for each one. Typically, each protocol is chosen based on which network the other device is in, since a given network typically uses a single protocol for all communications. But having multi-protocol capability in each of two conventional devices does little to improve any one specific communication between those two devices in a conventional network.

BRIEF DESCRIPTION OF THE DRAWINGS

Some embodiments of the invention may be better understood by referring to the following description and accompanying drawings that are used to illustrate embodiments of the invention. In the drawings.

DETAILED DESCRIPTION

Figure 1:
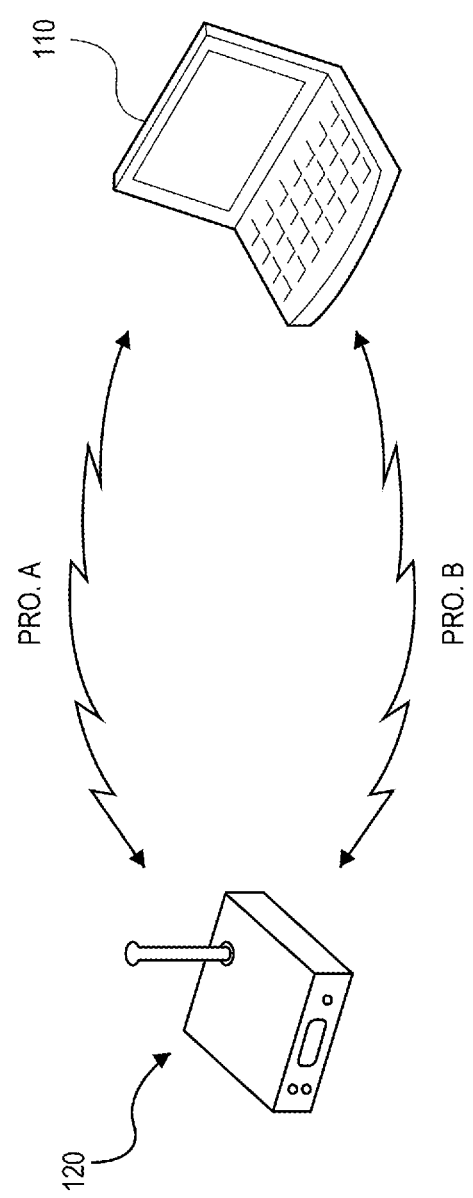
FIG. 1 shows two wireless devices communicating with each other, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a computer-readable medium, which may be read and executed by one or more processors to enable performance of the operations described herein. A computer-readable medium may include any mechanism for storing information in a form readable by one or more computers. For example, a computer-readable medium may include a tangible storage medium, such as but not limited to read only memory (ROM); random access memory (RAM); magnetic disk storage media; optical storage media; a flash memory device, etc.

The term "wireless" may be used to describe circuits, devices, systems, methods, techniques, communications channels, etc., that communicate data by using modulated electromagnetic radiation through a non-solid medium. The term does not imply that the associated devices do not contain any wires. A wireless device may comprise at least one antenna, at least one radio, at least one memory, and at least one processor, where the radio transmits signals through the antenna that represent data and receives signals through the antenna that represent data, while the processor may process the data to be transmitted and the data that has been received. The processor may also process other data which is neither transmitted nor received.

As used within this document, the term "communicating" means 1) wirelessly transmitting to another device, or 2) wirelessly receiving from that device, or 3) both wirelessly transmitting to that device and wirelessly receiving from that device. The data to be communicated may include the content to be transferred, control data to indicate how to extract the content from the full communication, verification data to determine if the data that was received was the same data that was transmitted, and preamble data to permit the receiver to synchronize on the incoming signal.

As used within this document, the term 'protocol' indicates a particular set of formats, channels, modulation techniques, rules of communication, etc. that have been defined in one or more standards for communicating wirelessly. For example, WiFi, WiMAX, LTE, and Bluetooth are each considered different protocols, and for some purposes each of these may even be subdivided into multiple separate protocols.

As used within this document, the term 'simultaneous' communication means that two communications (transmitting, receiving, or both) happen at the same time, while the term 'concurrent' communication means that the two communications may occur during the same period of time, but do not necessarily happen at the same time. Concurrent communication is the broader term, and may include instances of simultaneous communication. If two communications overlap in time partially but not completely, the overall communications may be described as concurrent, while the overlapping portion may be described as simultaneous. As a practical matter, different protocols may use some, all, or none of the same radio hardware in the same device for concurrent or simultaneous communication.

Within the context of this document, communicating simultaneously with first and second protocols indicates that both protocols are being used in transmission and/or reception at the same time, while communicating concurrently with first and second protocols means that a particular sequence of transmissions and/or receptions may use both protocols during a particular time period, but one protocol may or may not be in use at exactly the same time as the other.

In various embodiments, two devices may communicate with each other using multiple protocols, by dividing the data to be communicated into multiple parts, and using each protocol to communicate different parts. This technique may be used in several different ways to provide different types of advantages. Each of the two devices may serve any feasible function in the network(s) that are involved, such as network controller (access point, base station, central point, etc.), mobile device (mobile node, subscriber stations, STA, etc), relay station, server, or other. In some embodiments the data being communicated over the multiple protocols may be associated with a single application, such as but not limited to http traffic, video streaming, file downloads, email, network information, etc.).

FIG. 1 shows two wireless devices communicating with each other, according to an embodiment of the invention. The illustrated devices are a notebook computer 110 and a wireless controller 120, but they could be any two devices that communicate wirelessly with each other. The number of antenna on each device may be compatible with the particular protocols each device is capable of supporting. These devices are shown communicating with each other using two different protocols, indicated as Pro. A and Pro. B, although each device may be capable of supporting more than two protocols. The following descriptions will typically describe devices using two protocols to communicate with each other, using WiFi and WiMAX as examples, but the inventive concepts may be extended to three or more protocols, using any specific protocols that are feasible. Besides WiFi and WiMAX, other examples are LTE, Bluetooth, GSM, 3G, 4G, Zigbee, 60 GHz, etc.

Figure 2:
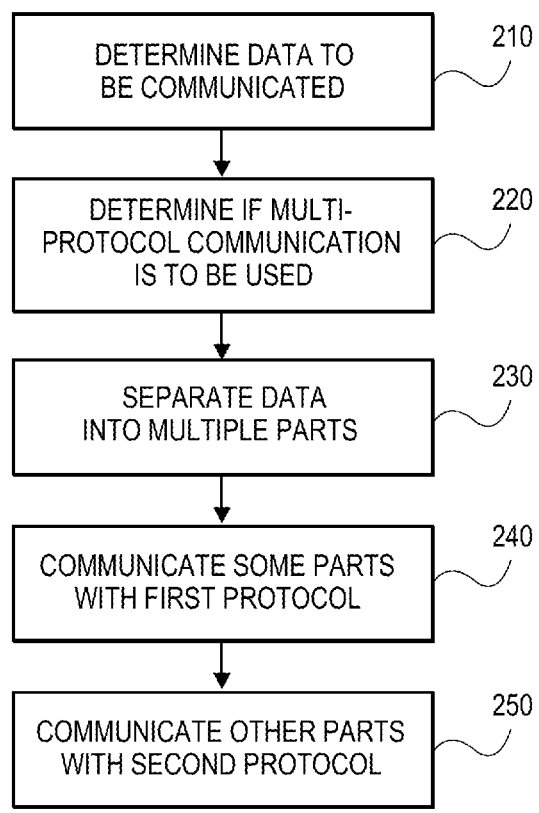
FIG. 2 shows a flow diagram of a method of communicating between two devices using multiple protocols, according to an embodiment of the invention.

FIG. 2 shows a flow diagram of a method of communicating between two devices using multiple protocols, according to an embodiment of the invention. In the illustrated example, a device determines at 210 that data is to be wirelessly communicated to a second device. This data may include not only data that is to be transmitted to the second device, but may also include data that is to be received from the second device. Such data may include the content that is to be communicated (in either direction), overhead data for defining how the content is organized, verification data for assuring the received data is uncorrupted, control data, etc.

At 220, the device may examine the nature of the data, the existing channel conditions, and any other relevant factors to determine if multiple protocols are to be used in the communication. In some embodiments, only the possibility of multi-protocol communication may be determined at this point, while the actual use of multiple protocols may be determined later based on conditions at that time.

At 230, the data to be communicated may be separated into multiple parts, with some parts to be communicated using one protocol and other parts to be communicated using a second protocol. In some instances, more than two protocols may be involved in this manner. The nature of the division into multiple parts may depend on various factors, such as but not limited to: 1) which protocols are available to both devices and supported by both devices, 2) the type of data to be transmitted, 3) channel loading, 4) channel quality, 5) data rates supported by the available protocols, 6) overhead requirements of the two protocols, 7) etc. In some instances, the division into multiple parts may take place after the communication sequence has begun, based on conditions at the time. In some embodiments the division into multiple parts may take place at the OSI PHY layer, in other embodiments at OSI MAC layer, in other embodiments at a higher layer. In some embodiments, division may take place across multiple layers. At 240 and 250, the different parts of the data may be communicated using the selected protocols. Of course, the receiver may subsequently take the data received over the multiple protocols and reassemble it into the original data. Since differences in the protocols may cause the different parts to be received out of order, suitable identification techniques may be used to determine the correct order in which to reassemble the data.

In some embodiments, at least one of the available protocols may use a predominantly controller-centric protocol in which a network controller schedules the communications by other devices in the network. In addition (or alternatively), at least one of the available protocols may use a contention-based technique in which each device must contend for access to the media before being allowed to transmit. Some protocols may allow both, with appropriate safeguards to prevent the unscheduled contention-based communications and the scheduled communications from interfering with each other if they use the same frequency bands. Further, some protocols may be designed for licensed spectrum, while others may operate over unlicensed spectrum. In some embodiments using both contention-based and scheduled protocols, the contention-based protocol may be given priority to gain access to the medium, and the scheduled protocol may then be scheduled in coordination with the contention-based protocol.

In some embodiments, a particular wireless device may use all or parts of the same radio for both protocols. For example, the device may use the same power amplifier(s) for transmission, the same tuner for reception, the same digital signal processor (DSP), the same antenna(s), etc. This may affect whether the device can communicate with both protocols simultaneously or if they must be used at different times in a concurrent operation. In some embodiments, the particular device may use all or parts of the same frequency spectrum for both protocols. This also may affect whether the device can communicate with both protocols simultaneously, since one protocol could interfere with another if the same or similar frequencies are being used at the same time.

The concept of two different devices using multiple protocols to communicate with each other simultaneously or concurrently may be used to advantage in a number of different ways. Some of these are described in the following sections.

Dynamic Interference Reduction

Figure 3:
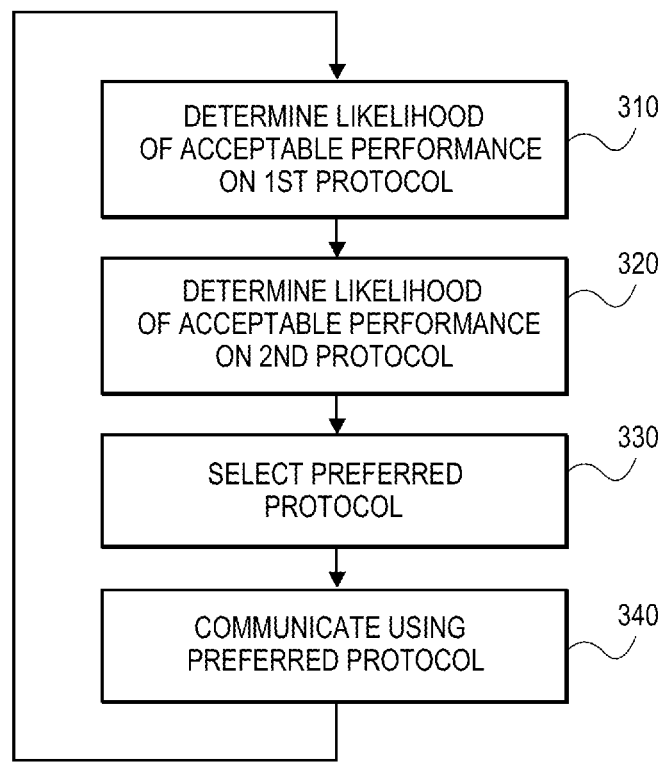
FIG. 3 shows a flow diagram of a method of basing multi-protocol communications on channel conditions, according to an embodiment of the invention.

FIG. 3 shows a flow diagram of a method of basing multi-protocol communications on channel conditions, according to an embodiment of the invention. At 310 and 320, the device may monitor channel conditions on both protocols to determine which protocol is more likely to produce better performance. This may be done before beginning the communication sequence to determine which protocol to use. This may also be done during the communication sequence to determine whether to switch to another protocol. Channel conditions may include anything that affects the likely error rate or probability of time-consuming error correction procedures. Signal to interference and noise ratio (SINR) is one such parameter that the device may measure directly, and/or it may receive SINR information from the other device as that parameter was determined by the other device. Received signal strength indicator (RSSI) is another parameter the device may use, whether measured directly or obtained from the other device.

SINR and RSSI are indirect indications of the probable error rate in the immediate future, but the device may obtain actual error rates from past performance. Such error rates may include the bit error rate (BER), packet error rate (PER), and other such parameters that imply immediate future performance based on past actual performance. As before, these parameters may be determined by the device through its own observations, or received from another device based on that device's determinations. By comparing such parameters from both protocols, the device may make a decision about which protocol is likely to provide the better performance in the immediate future.

After making this determination, the device may select the preferred protocol at 330 and use it for communication at 340. In some embodiments, the device may continue to monitor channel conditions, as indicated by the loop from 340 back to 310, and dynamically change the active protocol when conditions justify it. Since changing from one protocol to another may involve a certain amount of overhead traffic, in some embodiments a hysteresis effect may be used to require that a certain minimum level of performance improvement is likely before changing protocols.

Redundancy

Figure 4:
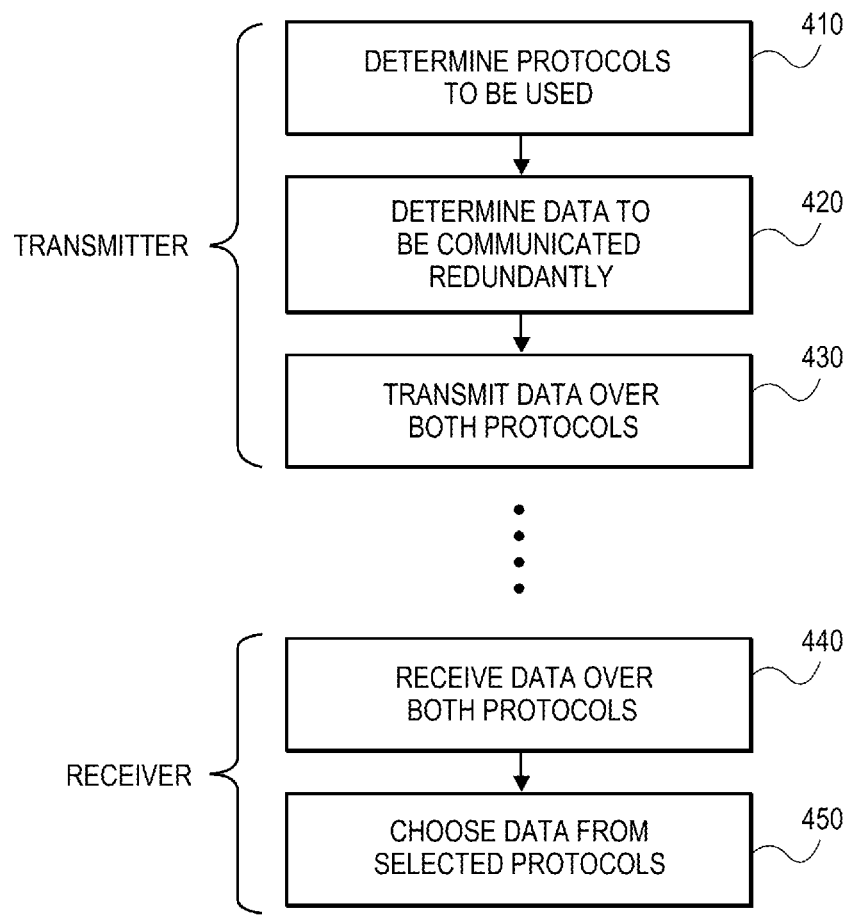
FIG. 4 shows a flow diagram of a method of using multiple protocols for communication redundancy, according to an embodiment of the invention.

FIG. 4 shows a flow diagram of a method of using multiple protocols for communication redundancy, according to an embodiment of the invention. Redundancy, as the term is used here, involves transmitting the same data over both protocols. This increases the probability that the correct data will be received, which decreases the probability that it will be lost or have to be retransmitted later. In the illustrated embodiment, the available protocols to be used may be determined at 410. This may be done in any feasible manner, including but not limited to techniques described elsewhere in this document. At 420, the data to be communicated redundantly may be determined, and transmitted at 430 over both protocols by the transmitter.

The data selected for redundant communication may be chosen based on various factors. The resultant selection may result in these or other choices: 1) the entire content may be communicated redundantly over both protocols, 2) the more important parts of the content may be communicated redundantly over both protocols, 3) overhead information, such as control information, headers, acknowledgements, requests for retransmission, etc. may be communicated redundantly over both protocols. The data may be encoded with various error correction coding techniques and the resulting redundant information may be transmitted over multiple protocols.

At 440, the redundant data may be received by the receiver, which may then select which set of redundant data to use at 450. This choice may be made based on various factors, such as but not limited to: 1) if both sets are received correctly, a predetermined preference may be followed, 2) if one set is received incorrectly and cannot be corrected by the receiver, the other set may be selected, 3) if one set is received correctly, and the other set is received incorrectly but can be corrected by the receiver, the correct set may be used or the receiver may correct and use the other set, 4) if both sets are received incorrectly and cannot be corrected, the receiver may request retransmission of one, both, or neither set.

Although FIG. 4 shows 410-430 being performed by the transmitter and 440-450 being performed by the receiver, other embodiments may distribute the functions in other ways. For example, the receiver may determine the protocols to be used and/or determine which data should be redundant, and communicate those choices to the transmitter.

Diversity

Figure 5:
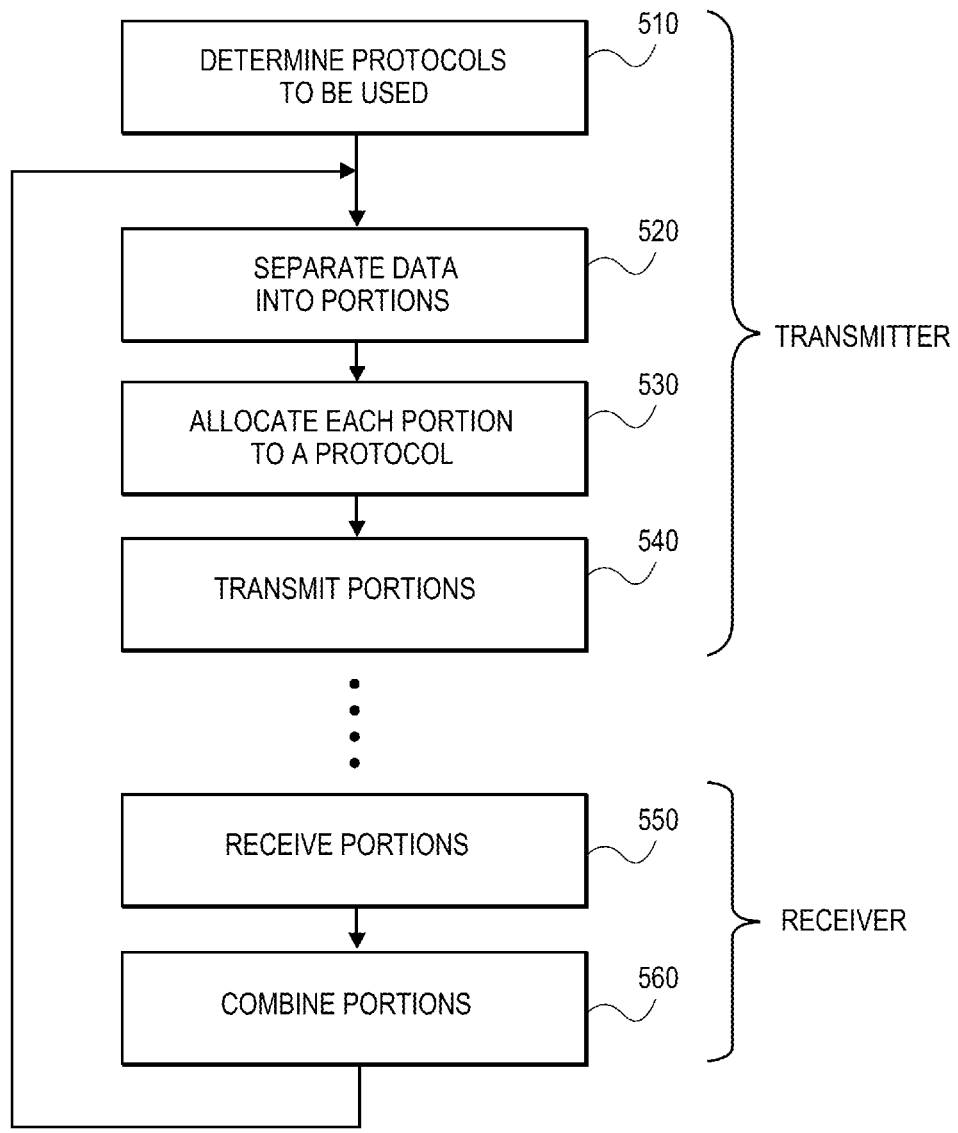
FIG. 5 shows a flow diagram of a method of using multiple protocols for communication diversity, according to an embodiment of the invention.

FIG. 5 shows a flow diagram of a method of using multiple protocols for communication diversity, according to an embodiment of the invention. Diversity, as the term is used here, involves splitting up the data and transmitting a portion over one protocol and another portion over another protocol. In some embodiments, the content may be split up and communicated over different protocols. In other embodiments, overhead data may be split up and communicated over different protocols. In still other embodiments, both content and overhead data may be split up and communicated over different protocols. In still other embodiments, content may be communicated over one protocol and overhead or control information over another protocol.

In the illustrated embodiment, the protocols to be used are determined at 510. At 520, the data to be transmitted is separated into multiple portions, and at 530 each portion is allocated to one of the protocols. This allocation may be based on various factors, such as but not limited to: 1) channel quality for each protocol, 2) available bandwidth of each protocol, 3) the time-criticality of each portion, 4) etc. The data portions may be transmitted over the respective protocols at 540 and received at 550. The receiver may then combine the portions at 560 to re-create the original message. The arrow looping back from 560 to 520 indicates that this process may be repeated continuously, so that the amount of data conveyed over each protocol may be changed as warranted by changing conditions.

Although FIG. 5 shows 510-540 being performed by the transmitter and 550-560 being performed by the receiver, other embodiments may distribute the functions in other ways. For example, the receiver may determine the protocols to be used and/or determine which data should be sent over which protocol, and communicate those choices to the transmitter.

Increased Resolution

Multi-protocol communication may be used to transmit increased data to achieve increased resolution of the data at the receiver, according to an embodiment of the invention. Resolution, as the term is used here, involves the amount of detail which can be created at the receiver with the data. For example, with video data the bits carrying the basic resolution (e.g., standard definition video) may be transmitted over one protocol, while additional bits for increased resolution (e.g., high definition video) may be transmitted over another protocol. These portions may then be combined at the receiver for creating the high-resolution image. If some of the additional resolution is not received correctly, that portion of the video may be shown at the basic resolution. This may be used advantageously, for example, by transmitting the basic resolution over licensed spectrum, where obtaining the necessary bandwidth is relatively assured, and transmitting the increased resolution bits over an unlicensed spectrum, where obtaining the necessary bandwidth may depend on the amount of other traffic competing for the medium.

In another example, additional error correcting code (ECC) may be transmitted over a different protocol. ECC data that will correct a certain number of errors may be transmitted with the content in the normal manner. Additional ECC information for that content, that will permit correcting more than that number of errors when combined with the basic ECC, may be available over the other protocol. In this way, the protocol carrying the basic message will not be slowed down with excessive ECC information that is seldom needed, but that additional ECC information will be available for those occasions when it is needed.

The flow diagram of FIG. 5 may also be used to illustrate this process for communicating increased resolution.

Load Balancing

Figure 6:
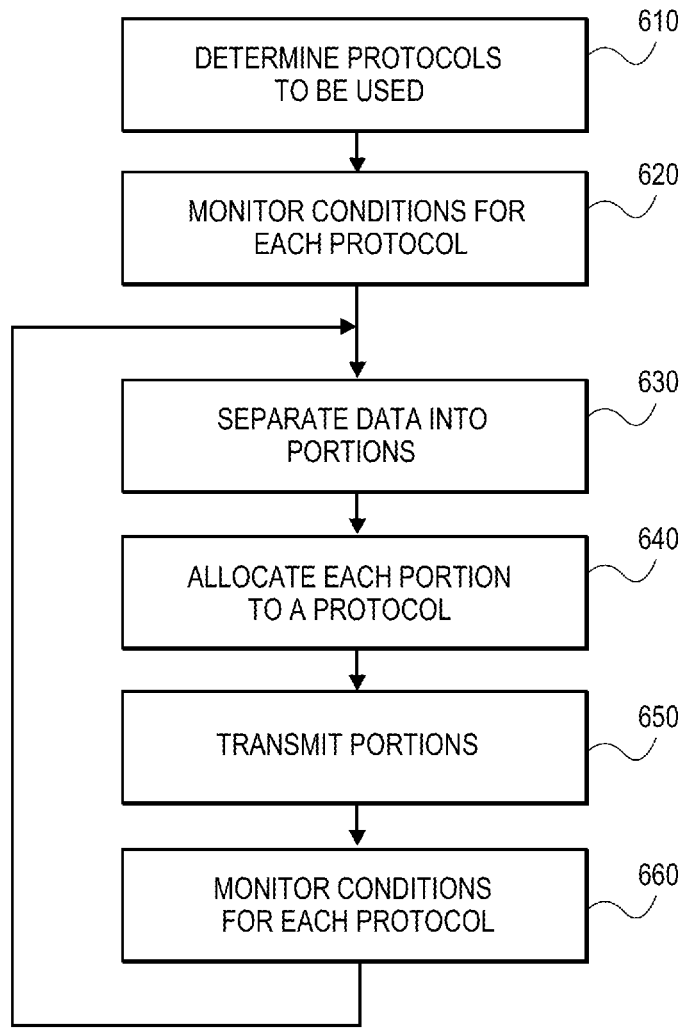
FIG. 6 shows a flow diagram of a method of using multiple protocols for load balancing, according to an embodiment of the invention.

FIG. 6 shows a flow diagram of a method of using multiple protocols for load balancing, according to an embodiment of the invention. Load balancing, as the term is used here, involves adjusting the amount of data transmitted over each protocol to reduce the chances that one protocol will suffer from excessive congestion while another protocol has excessive available capacity. For example, if the data traffic using one protocol becomes relatively congested, more data may be shifted to the other protocol. This may be done dynamically, by monitoring the data traffic for each protocol.

In the illustrated example, the protocols to be used are determined at 610. If only two protocols are available, those two may be used. If more than two are available, various criteria may be used to select the protocols to be used. At 620, the selected protocols may be monitored to determine how much available bandwidth each protocol is expected to have in the near future. Monitoring a particular protocol may be done in any feasible manner, such as but not limited to: 1) monitoring how much requested bandwidth is not allocated to a device in a scheduled protocol, 2) monitoring how long it takes to acquire access to the medium in an unscheduled protocol, 3) monitoring the amount of time the network appears to be busy, 4) monitoring the size of transmit queues, as observed in the device and/or as reported by other devices, 5) etc. Monitoring may be done by the device through direct observation, or by receiving reports of conditions from one or more other devices.

At 630, the data to be transmitted may be separated into multiple portions, and each portion may be allocated to one of the selected protocols at 640. This allocation may be done with the intent of avoiding the unbalanced loads as previously described, based on the bandwidth that each protocol is expected to have available. After beginning to transmit the data over both protocols at 650, the conditions for each protocol may be repeatedly monitored at 660. If these conditions indicate the load is becoming unbalanced (beyond a certain limit), operations may revert back to 630/640, where the data to be transmitted may be reallocated to the two protocols in a different proportion.

Although the example describes load balancing based on the communication between two different devices, load balancing may also consider how much each protocol is used with other devices. For example, if a network controller makes heavy use of a first protocol and light use of a second protocol when communicating with a first mobile device, the network controller may make light use of the first protocol and heavy use of the second protocol when communicating with a second mobile device, so that neither protocol will become too heavily congested.

Reduced Energy Consumption

Multi-protocol communications may be used to reduce energy consumption. Using an additional protocol may increase the spectrum over which the total communication may be spread. By spreading the transmission across more spectrum, the data rate on a given channel may be reduced approximately in proportion to the amount of increased spectrum. But the power it takes to transmit may change approximately exponentially in proportion to the change in data rate, so the overall power may be reduced proportionately more than the bandwidth is increased.

Reduced Overhead

Multi-protocol communications may be used to reduce overhead communications. Most network communications involve a certain amount of overhead information that must be communicated between devices. When two different protocols are being used to communicate the content, some of this overhead may be redundant, as it would normally be repeated on both protocols. For example, control information may be communicated that applies to the data communicated over both protocols. In some embodiments, such control information may be communicated over only one protocol, leaving more bandwidth on the other protocol for content. This may be especially useful for time-sensitive content, such as video content, in which a slight delay will be noticeable. By using a slower, contention-based protocol for the periodic control information, most of the faster, schedule-based protocol may be available to carry the video information.

The foregoing description is intended to be illustrative and not limiting. Variations will occur to those of skill in the art. Those variations are intended to be included in the various embodiments of the invention, which are limited only by the scope of the following claims.

What is claimed is:

1. A method, comprising:
   determining data to be communicated with a wireless device;
   separating the data into multiple parts;
   communicating a first part with the wireless device over a first wireless protocol, the first part to comprise data for a first video resolution; and
   communicating a second part with the wireless device over a second wireless protocol different than the first wireless protocol, the second part to comprise data for a second video resolution that is higher than the first video resolution.

2. The method of claim 1, wherein at least one of the first and second protocols are selected from a list of wireless protocols consisting of WiFi, WiMax, LTE, and Bluetooth.

3. The method of claim 1, wherein said communicating the first part is performed simultaneously with said communicating the second part.

4. The method of claim 1, wherein said communicating the first part is performed concurrently with said communicating the second part.

5. An apparatus, comprising a first device having a processor, a memory, and a radio, the first device to:

communicate data wirelessly with a second device, the data having first and second parts, the first part to comprise data for a first video resolution, the second part to comprise data for a second video resolution that is higher than the first video resolution; and communicate the first part with a first protocol and communicate the second part with a second protocol different than the first protocol;

wherein the first and second parts of the data are associated with a single application.

6. The apparatus of claim 5, wherein:

the first protocol is a contention-based protocol and the second protocol is a scheduled protocol;

the contention-based protocol is to be given a higher priority than the scheduled protocol, and the scheduled communication is to be scheduled around the contention-based communication.

7. The apparatus of claim 5, wherein said communicating the first part is to be performed simultaneously with said communicating the second part.

8. The apparatus of claim 5, wherein said communicating the first part is to be performed concurrently with said communicating the second part.

9. The apparatus of claim 5, wherein said communicating is to comprise transmitting encoded video at the first video resolution over the first protocol and transmitting additional resolution bits for the encoded video over the second protocol.

10. An article comprising a non-transitory computer-readable storage medium that contains instructions, which when executed by one or more processors result in performing operations comprising:

determining data to be communicated with a wireless device;

separating the data into multiple parts;

communicating a first part with the wireless device over a first wireless protocol, the first part to comprise data for a first video resolution; and communicating a second part with the wireless device over a second wireless protocol different than the first wireless protocol, the second part to comprise data for a second video resolution that is higher than the first video resolution.

11. The article of claim 10, wherein said separating takes place at a MAC layer.

12. The article of claim 10, wherein said separating takes place at a PHY layer.

13. The method of claim 1, comprising transmitting encoded video at the first video resolution over the first protocol and transmitting additional resolution bits for the encoded video over the second protocol.

14. The method of claim 1, the first video resolution to comprise a standard definition video resolution.

15. The method of claim 1, the second video resolution to comprise a high definition video resolution.

16. The method of claim 1, comprising:

communicating the first part over a licensed spectrum; and communicating the second part over an unlicensed spectrum.

17. The apparatus of claim 5, the first video resolution to comprise a standard definition video resolution.

18. The apparatus of claim 5, the second video resolution to comprise a high definition video resolution.

19. The apparatus of claim 5, the first device to communicate the first part over a licensed spectrum and communicate the second part over an unlicensed spectrum.

20. The article of claim 10, the non-transitory computer-readable storage medium containing instructions that, when executed by the one or more processors, result in performing operations comprising transmitting encoded video at the first video resolution over the first protocol and transmitting additional resolution bits for the encoded video over the second protocol.

21. The article of claim 10, the first video resolution to comprise a standard definition video resolution.

22. The article of claim 10, the second video resolution to comprise a high definition video resolution.

23. The article of claim 10, the non-transitory computer-readable storage medium containing instructions that, when executed by the one or more processors, result in performing operations comprising:

communicating the first part over a licensed spectrum; and communicating the second part over an unlicensed spectrum.

* * * * *